(12) United States Patent
Klein

(10) Patent No.: US 9,150,244 B2
(45) Date of Patent: Oct. 6, 2015

(54) FRICTION ESTIMATION AND DETECTION FOR AN ELECTRIC POWER STEERING SYSTEM

(75) Inventor: Steven D. Klein, Munger, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 931 days.

(21) Appl. No.: 12/755,526

(22) Filed: Apr. 7, 2010

(65) Prior Publication Data

US 2010/0256870 A1 Oct. 7, 2010

Related U.S. Application Data

(60) Provisional application No. 61/167,341, filed on Apr. 7, 2009.

(51) Int. Cl.
*B62D 5/02* (2006.01)
*B62D 5/04* (2006.01)
*B62D 6/00* (2006.01)
*G01L 5/20* (2006.01)

(52) U.S. Cl.
CPC .................................. *B62D 5/0481* (2013.01)

(58) Field of Classification Search
CPC .......... B60T 2201/087; B60T 2210/12; B60T 8/172; B60T 2260/02; B60T 2260/08; B60T 8/17551; B60T 8/17555; B60W 10/20; B60W 2510/20; B60W 2520/125; B60W 30/02; B62D 15/025; B62D 15/029; B62D 5/0466
See application file for complete search history.

(56) References Cited

U.S. PATENT DOCUMENTS

| | | | | |
|---|---|---|---|---|
| 4,771,845 A * | 9/1988 | Shimizu | ......................... | 180/446 |
| 5,040,629 A * | 8/1991 | Matsuoka et al. | ............ | 180/446 |
| 5,740,040 A * | 4/1998 | Kifuku et al. | ................... | 701/41 |
| 6,239,568 B1 * | 5/2001 | Sugitani et al. | ............... | 318/466 |
| 6,262,547 B1 * | 7/2001 | Kifuku et al. | ................. | 318/432 |
| 6,408,234 B1 * | 6/2002 | Wittig | ............................. | 701/41 |
| 6,876,910 B2 * | 4/2005 | Kifuku | ........................... | 701/41 |
| 7,136,732 B2 * | 11/2006 | Shimizu et al. | ................. | 701/41 |
| 7,308,964 B2 * | 12/2007 | Hara et al. | ..................... | 180/446 |
| 7,391,304 B2 * | 6/2008 | Kataoka et al. | ............... | 340/435 |
| 2003/0006088 A1* | 1/2003 | Parker | ........................... | 180/446 |
| 2003/0051560 A1* | 3/2003 | Ono et al. | ................... | 73/862.08 |
| 2004/0133324 A1* | 7/2004 | Yasui et al. | ..................... | 701/41 |
| 2004/0133330 A1* | 7/2004 | Ono et al. | ........................ | 701/80 |
| 2005/0125131 A1* | 6/2005 | Kato et al. | ........................ | 701/70 |
| 2006/0080016 A1* | 4/2006 | Kasahara et al. | ............... | 701/41 |

(Continued)

FOREIGN PATENT DOCUMENTS

DE 102004017660 A1 10/2005
DE 102006031716 A1 1/2008

(Continued)

OTHER PUBLICATIONS

European Search Report for application No. 10003735.7-1264/2239180 dated Nov. 12, 2010.

*Primary Examiner* — Ryan Zeender
*Assistant Examiner* — Dana Amsdell
(74) *Attorney, Agent, or Firm* — Cantor Colburn LLP

(57) ABSTRACT

A method of estimating friction in a steering system controlled by a control module is provided. The method includes performing by the control module, estimating a steering load gain; estimating a steering load hysteresis; and determining friction based on the steering load gain, the steering load hysteresis, and a reference model.

18 Claims, 6 Drawing Sheets

(56) References Cited

U.S. PATENT DOCUMENTS

| | | | |
|---|---|---|---|
| 2007/0029129 A1* | 2/2007 | Shiozawa et al. | 180/446 |
| 2007/0050112 A1* | 3/2007 | Kroehnert et al. | 701/41 |
| 2008/0162001 A1* | 7/2008 | Chai et al. | 701/42 |
| 2010/0100283 A1* | 4/2010 | Hales et al. | 701/42 |
| 2011/0190984 A1* | 8/2011 | Reeve | 701/41 |

FOREIGN PATENT DOCUMENTS

| | | |
|---|---|---|
| EP | 2072373 A2 | 6/2009 |
| JP | 2002308131 A | 10/2002 |

\* cited by examiner

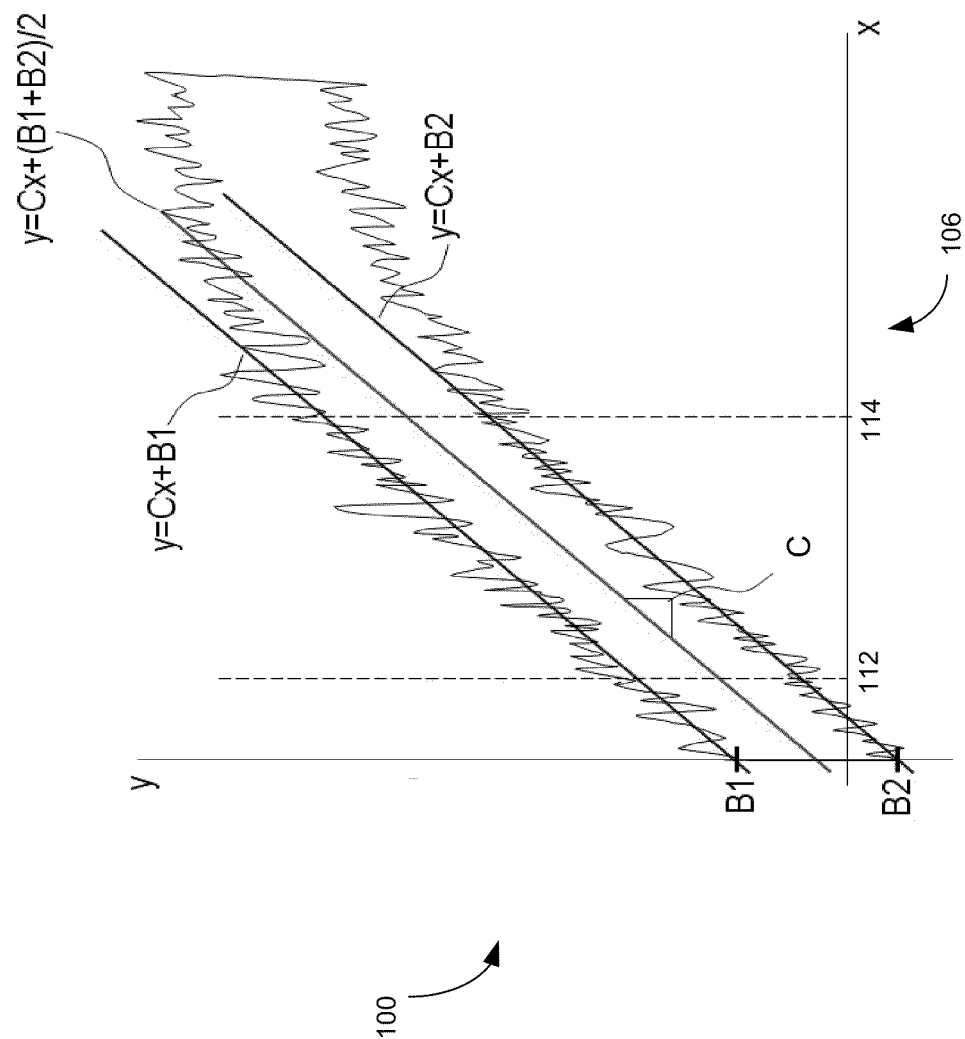

FRICTION ESTIMATION AND DETECTION FOR AN ELECTRIC POWER STEERING SYSTEM

CROSS-REFERENCE TO RELATED APPLICATIONS

This patent application claims priority to U.S. Provisional Patent Application Ser. No. 61/167,341 filed Apr. 7, 2009 which is incorporated herein by reference in its entirety.

FIELD

Exemplary embodiments of the present invention are related to control systems and methods for power steering systems.

BACKGROUND

In power steering systems, it is desirable to estimate the overall friction of the system for multiple purposes. First, if friction is excessive, it may impact the ability of the driver to maintain directional control of the vehicle. In this case, the driver should be notified of the condition in order to have it serviced. Second, for steering feel, the friction feel to the driver can be reduced if the friction magnitude is estimated accurately.

SUMMARY

A method of estimating friction in a steering system controlled by a control module is provided. The method includes performing by the control module, estimating a steering load gain; estimating a steering load hysteresis; and determining friction based on the steering load gain, the steering load hysteresis, and a reference model.

BRIEF DESCRIPTION OF THE DRAWINGS

Other objects, features, advantages and details appear, by way of example only, in the following detailed description of embodiments, the detailed description referring to the drawings in which:

FIG. 5 is a graph illustrating lateral acceleration verses steering load;

DESCRIPTION OF THE EMBODIMENTS

Figure 1:
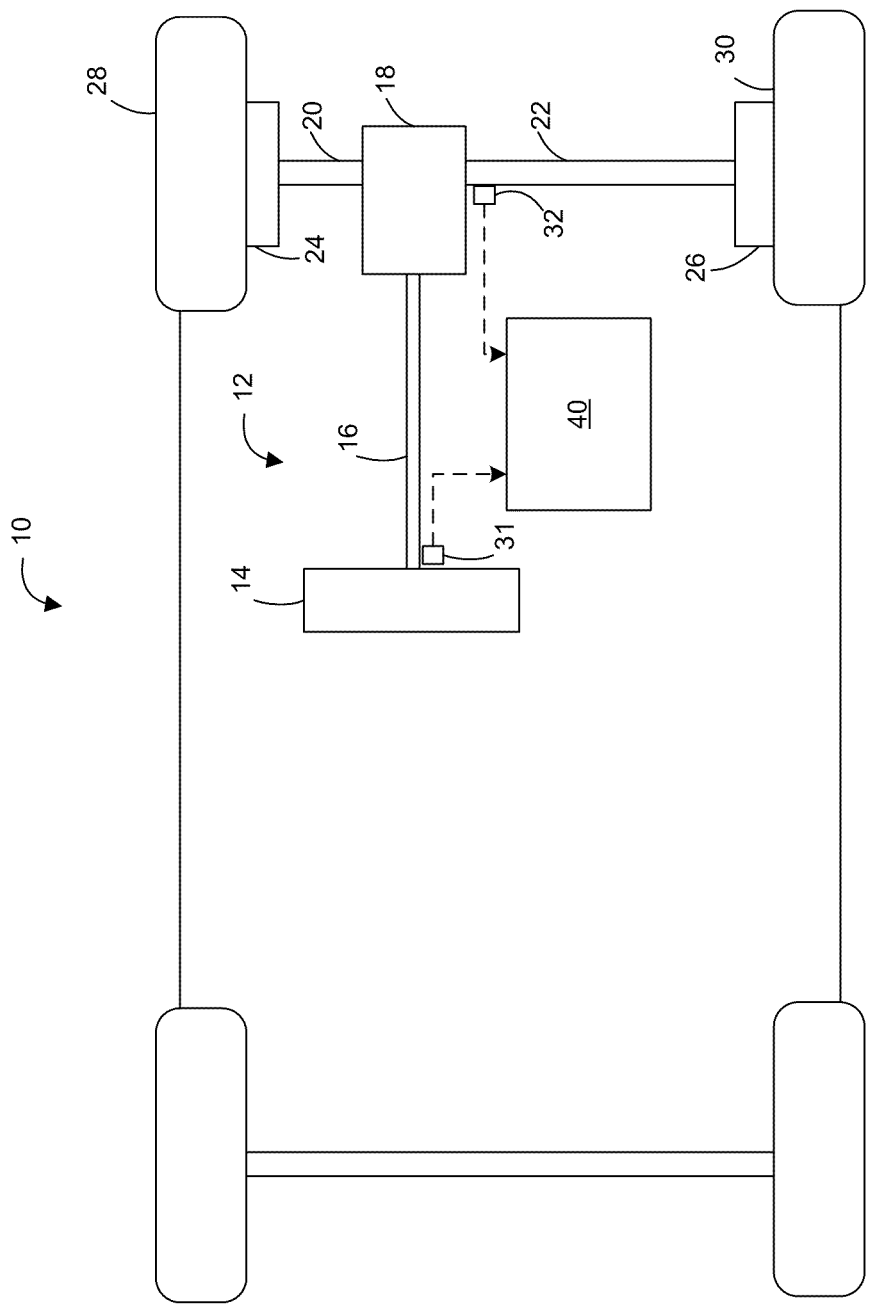
FIG. 1 is a functional block diagram of a vehicle that includes a friction estimation system in accordance with an exemplary embodiment.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle 10 including a steering system 12 is illustrated. In various embodiments, the steering system 12 includes a hand wheel 14 coupled to a steering shaft 16. In an exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing. During operation, as the hand wheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors 31, 32 that detect and measure observable conditions of the steering system 12 and/or of the vehicle 10. The sensors can include, for example, a vehicle speed sensor, a steering angle sensor, and a torque sensor. The sensors 31, 32 generate sensor signals based on the observable conditions. A control module 40 controls the operation of the steering system 12 based on one or more of the sensor signals and further based on the steering control systems and methods of the present disclosure. Generally speaking, the steering control systems and methods of the present disclosure estimate a friction of the steering system 12. Based on the friction, the control module 40 generates one or more notification and/or control signals to control the steering system 12.

Figure 2:
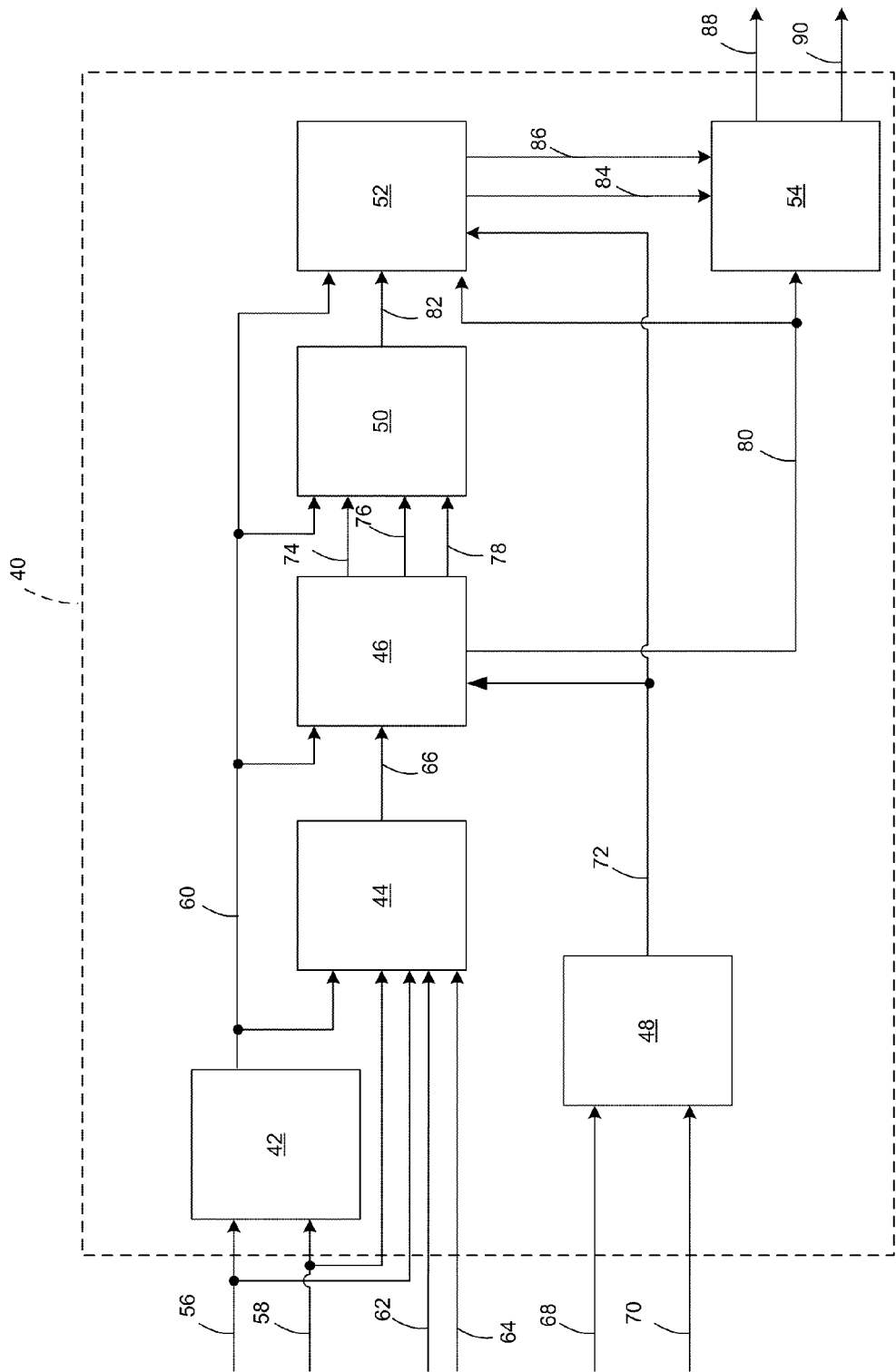
FIG. 2 is a dataflow diagram illustrating a control module that includes the friction estimation system in accordance with an exemplary embodiment.

Referring now to FIG. 2, a dataflow diagram illustrates an exemplary embodiment of the control module 40 of FIG. 1. In various embodiments, the control module 40 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules shown in FIG. 2 can be combined and/or further partitioned to similarly estimate friction and control the steering system 12 (FIG. 1). Inputs to the control module 40 can be generated from the sensors 31, 32 (FIG. 1) of the vehicle 10 (FIG. 1), can be modeled, can be received from other control modules (not shown) within the vehicle 10 (FIG. 1), and/or can be predefined.

In various embodiments, the control module 40 includes a lateral acceleration module 42, a constraints module 44, a gain and hysteresis module 46, a summation module 48, a reference load module 50, a total friction module 52, and a friction evaluation module 54.

The lateral acceleration module 42 receives as input vehicle speed 58 and steering angle 56. Based on the inputs 56, 58, the lateral acceleration module 42 estimates lateral acceleration 60 of the vehicle 10 (FIG. 1)). In various embodiments, the lateral acceleration module 42 estimates the lateral acceleration 60 using a bicycle model of the vehicle 10 (FIG. 1). In one example, the lateral acceleration module 42 estimates the lateral acceleration 60 based on the following equation:

$$LA = \frac{HWA * V^2}{N*(57.3*9.81*L + K*V^2)}. \quad (1)$$

Where, the symbol LA represents lateral acceleration 60. The symbol HWA represents handwheel angle also referred to as the steering angle 56. The symbol V represents vehicle speed 58. The symbol L represents vehicle wheelbase. The symbol K represents an understeer coefficient. The symbol N represents steer ratio. In various embodiments, the vehicle wheelbase, the understeer coefficient, and the steer ratio can be predefined values.

In various other embodiments, the lateral acceleration module 42 estimates the lateral acceleration based on an acceleration value measured by an acceleration sensor, such as those used in, for example, stability control systems.

Figure 4:
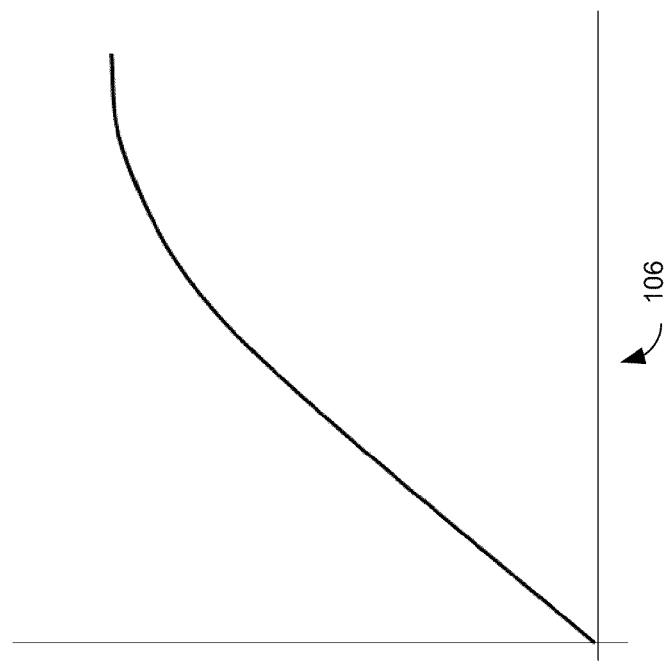
FIGS. 3 and 4 are graphs illustrating steering load verses steering angle or lateral acceleration.
Figure 3:
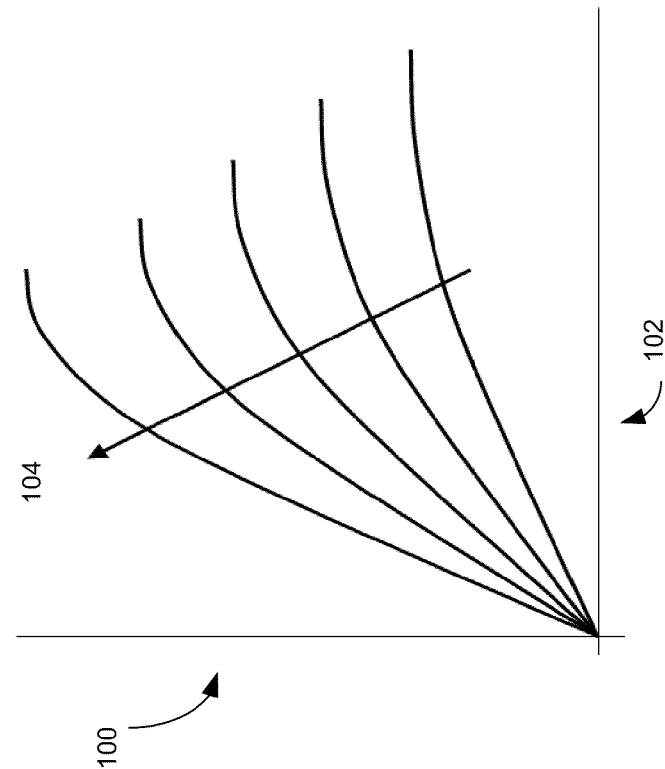

It is appreciated that the lateral acceleration module 42 can output steering angle 56 in place of the lateral acceleration 60. The difference is shown in FIGS. 3 and 4, where steering load 100 versus steering angle 102 changes as vehicle speed changes (increasing vehicle speed shown at 104). In contrast, the steering load 100 versus lateral acceleration 106 is reasonably constant through a wide range of vehicle speeds. The use of lateral acceleration 60 simplifies subsequent estimations. For ease of the discussion, the remainder of the disclosure will be discussed in the context of the lateral acceleration 60.

With reference back to FIG. 2, the constraints module 44 receives as input the lateral acceleration 60, the steering angle 56, the vehicle speed 58, steering velocity 62, and steering direction 64. Based on the inputs 56, 58, 62, 64, the constraints module 44 enables the estimation of friction (via enable parameter 66) by performing one or more checks to determine whether specific conditional constraints are met. In various embodiments, the friction estimation can be performed even when one or more of the conditional restraints are not met, so long as the purpose of the conditional constraint is met (i.e. to prevent error due to conditions which can dramatically change the steering loads on the vehicle) as indicated by the enable parameter 66.

For example, a rapid acceleration or deceleration, a quick steering input, a steering reversal, or a high lateral acceleration can cause one of the below conditional constraints to be out of range, thus, providing the possibility of an error in the estimation of friction. Table 1 lists exemplary conditions that the constraints module 44 can evaluate.

TABLE 1

| Input | Condition |
|---|---|
| Lateral Acceleration | Lateral Acceleration is above a minimum and below a maximum. |
| Vehicle Speed | Vehicle Speed is above a minimum and below a maximum. |
| Acceleration/ Deceleration | Acceleration/Deceleration above a minimum and below a maximum. |
| Steering Velocity | Steering Velocity is above a minimum and below a maximum. |
| Steering Angle | Steering Angle has traveled in the same direction for a minimum angle. |

As can be appreciated, the minimum and maximum conditions above can be predefined to achieve the desired performance for a given vehicle application.

The summation module 48 receives as input a steering assist value 68, and driver torque 70. Based on the inputs 68, 70, the summation module 48 estimates a total steering load 72. For example, the summation module 48 computes a sum of the force that the driver supplies to the steering system (driver torque 70) and the assisted force that the power steering assist system provides (steering assist value 68). In various embodiments, the mechanical reduction ratios are accounted for prior to the summation of the forces such that, the sum of forces uses the same reference frame, which may include either linear or column coordinates.

The gain and hysteresis module 46 receives as input the lateral acceleration 60, the enable parameter 66, and the steering load 72. When the enable parameter 66 indicates that friction can be estimated, the gain and hysteresis module 46 determines a gain 74, and a hysteresis 76, 78.

As shown in FIG. 5, the total steering load 100 is plotted versus lateral acceleration 106 based on exemplary data. This plot shows a hysteresis that exists in the steering load between the increasing lateral acceleration and decreasing lateral acceleration.

For the region between some minimum and maximum lateral acceleration 112, 114, such as 0.05 and 0.4 g's, the relationship between steering load and lateral acceleration is generally linear. By sampling this data, the linear relationship (slope and intercept) can be approximated. For example, when the lateral acceleration 106 is increasing, the relationship between steering load 100 and lateral acceleration 106 can be approximated as:

$$y = Cx + B1. \quad (2)$$

Where the symbol y represents steering load 100. The symbol x represents lateral acceleration 106. The symbol C represents the slope. The symbol B1 represents the y-axis intercept.

Likewise, for decreasing lateral acceleration, the relationship between steering load 100 and lateral acceleration 106 can be approximated as:

$$y = Cx + B2. \quad (3)$$

Where the symbol y represents steering load 100. The symbol x represents lateral acceleration 106. The symbol C represents the slope. The symbol B2 represents the y-axis intercept.

For the combined data in both directions the relationship can be approximated as:

$$y = Cx + (B1 + B2)/2; \quad (4)$$

or $$y = Cx + B_{ave}. \quad (5)$$

Using these equations, a unique solution can be solved for C (the gain 74), and B1 and B2 (the hysteresis 76, 78).

With reference back to FIG. 2, in various embodiments, the gain and hysteresis module 46 determines C using a set of data points (steering load and lateral acceleration) at any given instant in time. In one example, the gain and hysteresis module 46 computes C based on the following equation:

$$C = (L_{steer} - B_{ave})/LA. \quad (6)$$

Where the symbol $L_{steer}$ represents the steering load 72. The symbol $B_{ave}$ represents the average of B1 and B2 (i.e. (B1+B2)/2) with a unit-sample delay. In various embodiments, the initial condition of C can be the expected steering load gain for the vehicle, or the last-known value of C retrieved from memory at power-up.

The gain and hysteresis module 46 then limits the result within a reasonable range of expected values and filters the result by a low-pass filter with a low cutoff frequency (i.e., 0.1

Hz). The final value of C then represents a filtered "average" steering load gain 74 (steering load/lateral acceleration).

In various embodiments, the gain and hysteresis module 46 estimates the hysteresis value B1, when lateral acceleration 60 is increasing. In one example, the gain and hysteresis module 46 computes the hysteresis value B1 based on the following equation:

$$B1 = L_{steer} - C*LA. \quad (7)$$

The gain and hysteresis module 46 can limit B1 within a reasonable range and can filter B1 by a low-pass filter with a very low cutoff frequency (i.e., 0.1 Hz).

In the same manner, the gain and hysteresis module 46 can compute B2 when the lateral acceleration 60 is decreasing. For example, the gain and hysteresis module 46 computes the hysteresis value B2 based on the following equation:

$$B2 = L_{steer} - C*LA. \quad (8)$$

The gain and hysteresis module 46 can limit B2 within a reasonable range and can filter B1 by a low-pass filter with a low cutoff frequency (i.e., 0.1 Hz).

Thereafter, the gain and hysteresis module 46 can compute an average friction 80. For example, the gain and hysteresis module 46 computes the average friction based on the following equation:

$$F_{ave} = (B1 - B2)/2. \quad (9)$$

In various embodiments, the initial conditions for B1 and B2 may be zero, or alternatively, the last-known values retrieved from non-volatile memory at power-up. As can be appreciated, these computations require minimal data storage and computational complexity compared to alternate sampling and curve fitting techniques. These computations also compensate for changes in the vehicle's handling characteristics such as changes in the tires, suspension, road surface, etc.

Figure 7:
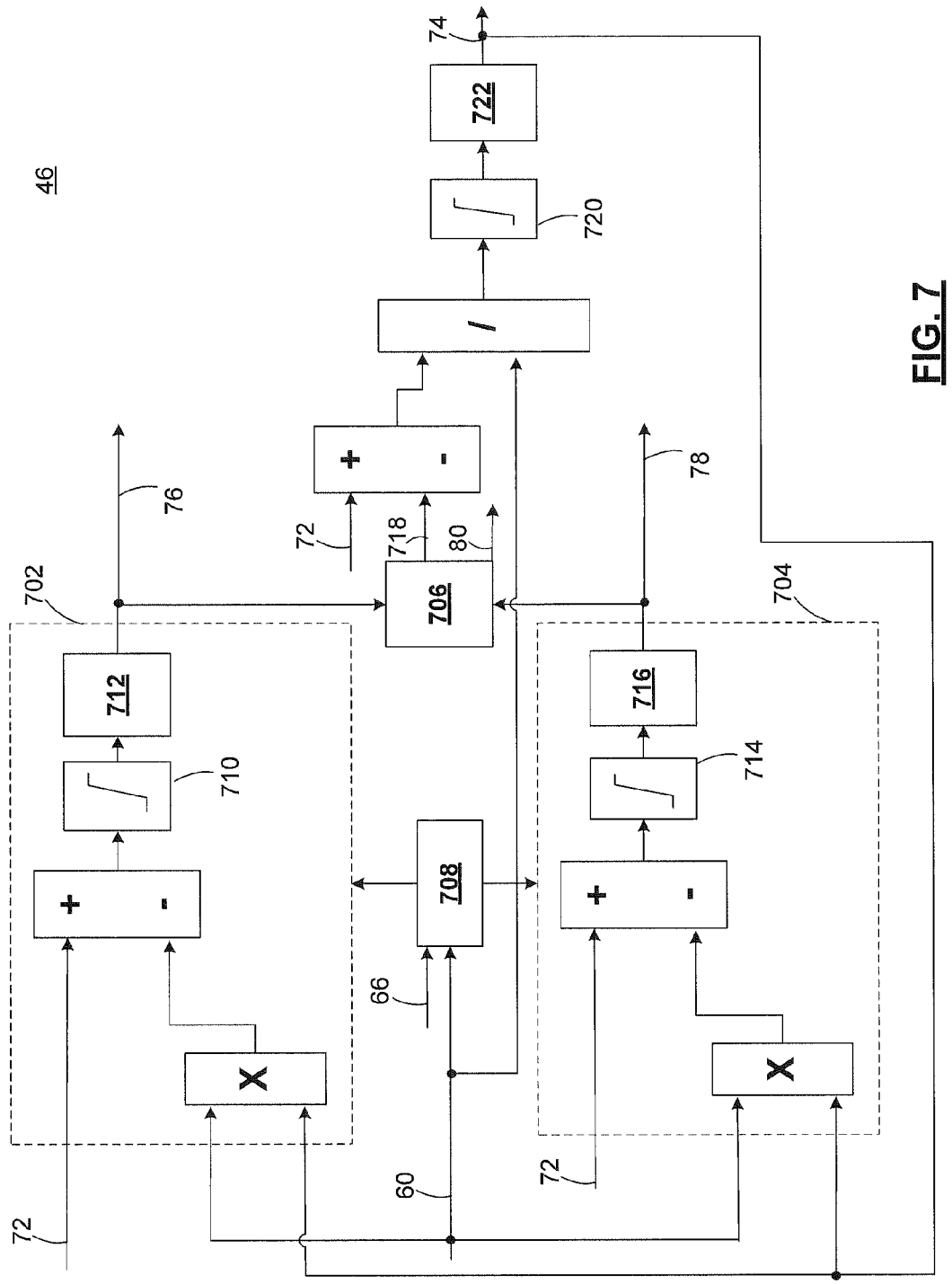
FIG. 7 is a dataflow diagram illustrating a gain and hysteresis module in accordance with an exemplary embodiment.

The previously described equations and relationships of the gain and hysteresis module 46 are depicted in FIG. 7. The gain and hysteresis module 46 computes steering load gain 74 as steering load gain C according to equation (6). Module 702 computes hysteresis 76 as first hysteresis value B1 according to equation (7). Module 704 computes hysteresis 78 as second hysteresis value B2 according to equation (8). Module 706 computes the average friction 80 according to equation (9). Module 708 enables module 702 to compute the hysteresis value B1 based on enable parameter 66 and a determination that the lateral acceleration 60 is increasing. Module 708 enables module 704 to compute the hysteresis value B2 based on enable parameter 66 and a determination that the lateral acceleration 60 is decreasing. As depicted in FIG. 7, module 702 computes hysteresis value B1 as the steering load 72 minus the steering load gain 74 multiplied by the lateral acceleration 60, which can be further conditioned by limiter 710 and low-pass filter 712. Similarly, module 704 computes hysteresis value B2 as the steering load 72 minus the steering load gain 74 multiplied by the lateral acceleration 60, which can be further conditioned by limiter 714 and low-pass filter 716. Module 706 computes the average friction 80 and $B_{ave}$ 718 based on hysteresis values B1 and B2 from modules 702 and 704. The gain and hysteresis module 46 can compute steering load gain C as the steering load 72 minus $B_{ave}$ 718 divided by the lateral acceleration 60, which can be further conditioned by limiter 720 and low-pass filter 722.

The reference load module 50 receives as input the gain 74 (c), the hysteresis 76, 78 (B1, B2), and the lateral acceleration 60. Based on the inputs 60, 74-78, the reference load module 50 estimates a reference load 82. In various embodiments, the reference load module 50 determines whether the lateral acceleration 60 is increasing or decreasing and estimates the reference load 82 based thereon. In various embodiments, the reference load module 50 estimates the reference load 82 using the parameter B1 when the lateral acceleration is increasing. For example, the reference load module 50 computes the reference load 82 based on the following equation:

$$L_{ref} = C*LA + B1. \quad (10)$$

In various embodiments, the reference load module 50 estimates the reference load 82 using the parameter B2 when the lateral acceleration 60 is decreasing. For example, the reference load module 50 computes the reference load 82 based on the following equation:

$$L_{ref} = C*LA + B2. \quad (11)$$

The total friction module 52 receives as input the lateral acceleration 60, the average friction 80, the reference load 82, and the steering load 72. Based on the inputs 82, 72, the total friction module 52 estimates additional friction 84 beyond the reference load 82. The additional friction 84 indicates localized excessive friction conditions.

In various embodiments, the total friction module 52 determines whether the lateral acceleration 60 is increasing or decreasing and estimates the additional friction 84 based thereon. For example, when the lateral acceleration 60 is increasing, the total friction module 52 determines the additional friction 84 based on the following equation:

$$F_{add} = L_{steer} - L_{ref}. \quad (12)$$

Where the symbol $L_{steer}$ represents the steering load 72. In another example, when the lateral acceleration 60 is decreasing, the total friction module 52 determines the additional friction 84 based on the following equation:

$$F_{add} = L_{ref} - L_{steer}. \quad (13)$$

In various embodiments, the additional friction 84 can be limited to a minimum value (i.e., zero). The total friction module 52 can then compute total friction 86 as the sum of the average friction 80 and the additional friction 84.

The friction evaluation module 54 receives as input the average friction 80, the additional friction 84, and the total friction 86. Based on the inputs, excessive friction can be detected by comparing one or more of the values to predetermined thresholds. For example an average friction might be in the range of about 1 Newton meters (Nm) to about 5 Nm, with an expected average of about 3 Nm. A total friction might be in the range of about 2 to 15 Nm.

If any value exceeds its threshold, the friction can be determined as 'too high.' Under this condition, the friction evaluation module 54 may notify the driver that service should be performed before continued use of the system via a notification signal 88. The notice can be in the form of a warning lamp, disabling the steering system 12 (FIG. 1), or other warning mechanisms. In various other embodiments, the steering system 12 can be controlled based on any of the friction values via control signal 90.

Figure 6:
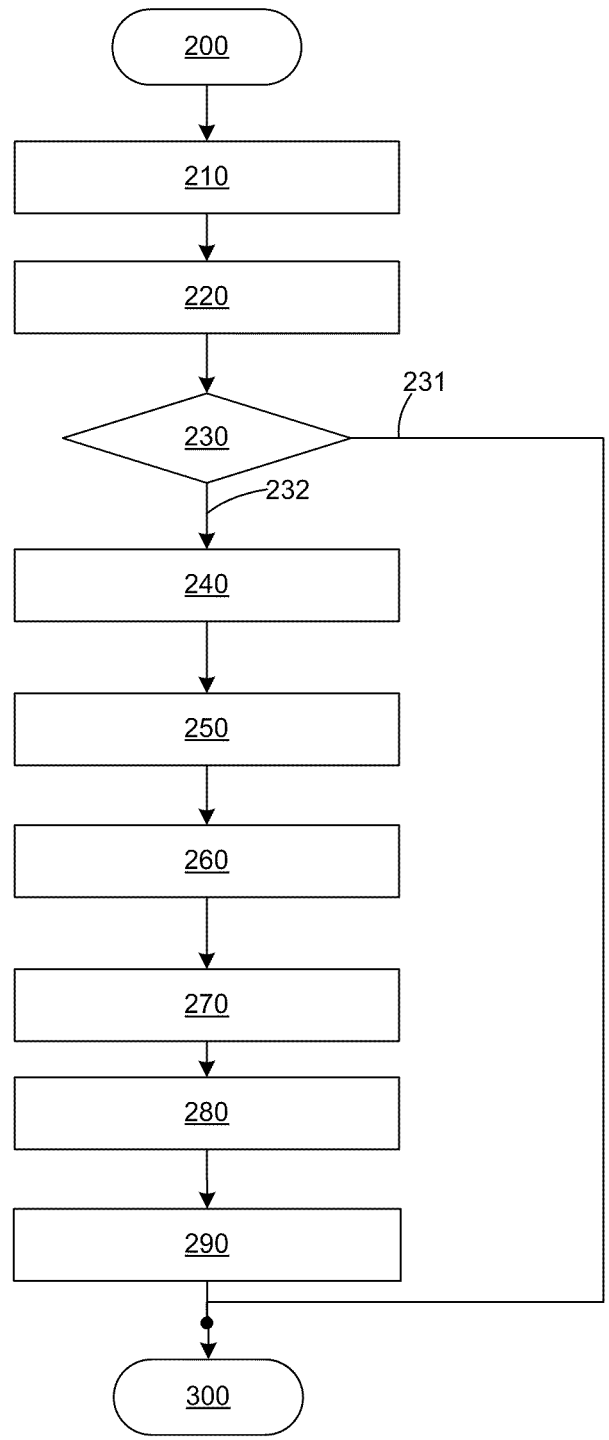
FIG. 6 is a flowchart illustrating a friction estimation method in accordance with an exemplary embodiment.

Referring now to FIG. 6 and with continued reference to FIG. 2, a flowchart illustrates a friction estimation method that can be performed by the control module 40 of FIG. 1. As can be appreciated in light of the disclosure, the order of operation within the method is not limited to the sequential execution as illustrated in FIG. 6, but may be performed in one or more varying orders as applicable and in accordance with the present disclosure.

As can be appreciated, the friction estimation method can be scheduled to run based on predetermined events and/or can run at scheduled intervals during operation of the vehicle 10 (FIG. 1).

In one example, the method may begin at 200. The lateral acceleration 60 is determined at 210. The steering load 72 is determined at 220. The conditional constraints are evaluated at 230. If the conditional constraints do not pass at 231, the method may end at 300.

If, however, the conditional constraints pass at 232, the gain 74 and hysteresis 76, 78 are computed based on the steering load 72 and lateral acceleration 60 or steering angle at 240. The average friction 80 is computed based on the gain 74 and hysteresis 76, 78 at 250. The reference load 82 is computed based on the gain 74, the hysteresis 76, 78, and the lateral acceleration 60 at 260. The additional friction 84 is computed based on the steering load 72 and the reference load 82 at 270. The total friction is computed based on the average friction 80 and the additional friction 84 at 280. Thereafter, the steering system 12 (FIG. 1) may evaluate the friction values and generate the warning signal 88 based thereon and/or may control the steering system 12 (FIG. 1) based on the friction values at 290. The method may end at 300.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

It is claimed:

1. A method of estimating friction in a steering system controlled by a control module, comprising:
    performing by the control module,
        computing lateral acceleration based on steering angle and vehicle speed;
        estimating a steering load gain by determining a difference between a steering load and an average hysteresis value, and dividing the difference by the lateral acceleration;
        estimating a steering load hysteresis comprising: a first hysteresis value based on the lateral acceleration increasing as the steering load minus the steering load gain multiplied by the lateral acceleration, and a second hysteresis value based on the lateral acceleration decreasing as the steering load minus the steering load gain multiplied by the lateral acceleration, the average hysteresis value being an average of time delayed values of the first and second hysteresis values;
        determining friction in the steering system based on the steering load gain, the steering load hysteresis, and a reference model; and
        initiating a warning signal when the friction in the steering system exceeds at least one threshold.

2. The method of claim 1, wherein the performing by the control module further includes initiating a control signal to control the steering system based on the friction.

3. The method of claim 1, wherein the estimating the steering load hysteresis is based on the steering load and steering angle.

4. The method of claim 1, wherein the performing by the control module further comprises, determining additional friction based on the friction and the steering load gain.

5. The method of claim 4, wherein the performing by the control module further comprises, determining a total friction based on the friction and the additional friction.

6. A method of estimating the friction in a steering system controlled by a control module, comprising performing by the control module:
    computing lateral acceleration based on steering angle and vehicle speed;
    computing a steering load based on one or more forces applied to the steering system;
    computing a reference steering load based on the lateral acceleration, a steering load gain and a hysteresis, the steering load gain comprising a difference between the steering load and an average hysteresis value divided by the lateral acceleration, the hysteresis comprising: a first hysteresis value based on the lateral acceleration increasing as the steering load minus the steering load gain multiplied by the lateral acceleration, and a second hysteresis value based on the lateral acceleration decreasing as the steering load minus the steering load gain multiplied by the lateral acceleration, the average hysteresis value being an average of time delayed values of the first and second hysteresis values;
    computing total friction in the steering system based on the steering load and the reference steering load;
    comparing the total friction in the steering system to a threshold; and
    initiating a warning signal based on the comparing.

7. The method of claim 6, further comprising at least one of lighting a warning lamp, activating an audible signal, and controlling the steering system based on the warning signal.

8. The method of claim 6, wherein the determining whether excessive friction exists includes comparing at least one of average friction, additional friction, and total friction to a predetermined threshold for each.

9. The method of claim 6, including determining whether at least one conditional constraint is within a specified range before continuing with the friction estimation.

10. A vehicle, comprising:
    a steering system; and
    a control module in communication with the steering system, the control module computes a lateral acceleration based on steering angle and vehicle speed, estimates a steering load gain as a difference between a steering load and an average hysteresis value divided by a lateral acceleration, estimates a steering load hysteresis, determines friction in the steering system based on the steering load gain, the steering load hysteresis, and a reference model, and initiates a warning signal when the friction in the steering system exceeds at least one threshold, the steering load hysteresis comprising: a first hysteresis value based on the lateral acceleration increasing as the steering load minus the steering load gain multiplied by the lateral acceleration, and a second hysteresis value based on the lateral acceleration decreasing as the steering load minus the steering load gain multiplied by the lateral acceleration, the average hysteresis value being an average of time delayed values of the first and second hysteresis values.

11. The vehicle of claim 10, wherein control module initiates a control signal to control the steering system based on the friction.

12. The vehicle of claim 10, wherein the control module estimates the steering load hysteresis based on the steering load and steering angle.

13. The vehicle of claim 10, wherein the control module determines additional friction based on the friction and the steering load gain.

14. The vehicle of claim 13, wherein control module determines a total friction based on the friction and the additional friction.

15. The vehicle of claim 10, wherein the steering system is an electric power steering system.

16. The method of claim 1, wherein the reference model comprises:
   the steering load gain multiplied by the lateral acceleration plus the first hysteresis value based on the lateral acceleration increasing; and
   the steering load gain multiplied by the lateral acceleration plus the second hysteresis value based on the lateral acceleration decreasing.

17. The method of claim 6, wherein the reference steering load is computed as:
   the steering load gain multiplied by the lateral acceleration plus the first hysteresis value based on the lateral acceleration increasing; and
   the steering load gain multiplied by the lateral acceleration plus the second hysteresis value based on the lateral acceleration decreasing.

18. The vehicle of claim 10, wherein the reference model comprises:
   the steering load gain multiplied by the lateral acceleration plus the first hysteresis value based on the lateral acceleration increasing; and
   the steering load gain multiplied by the lateral acceleration plus the second hysteresis value based on the lateral acceleration decreasing.

* * * * *